Jan. 26, 1954  C. L. KEATING, JR  2,667,040
ABSORPTION REFRIGERATION SYSTEM FOR MOBILE APPLICATION
Filed Dec. 21, 1951
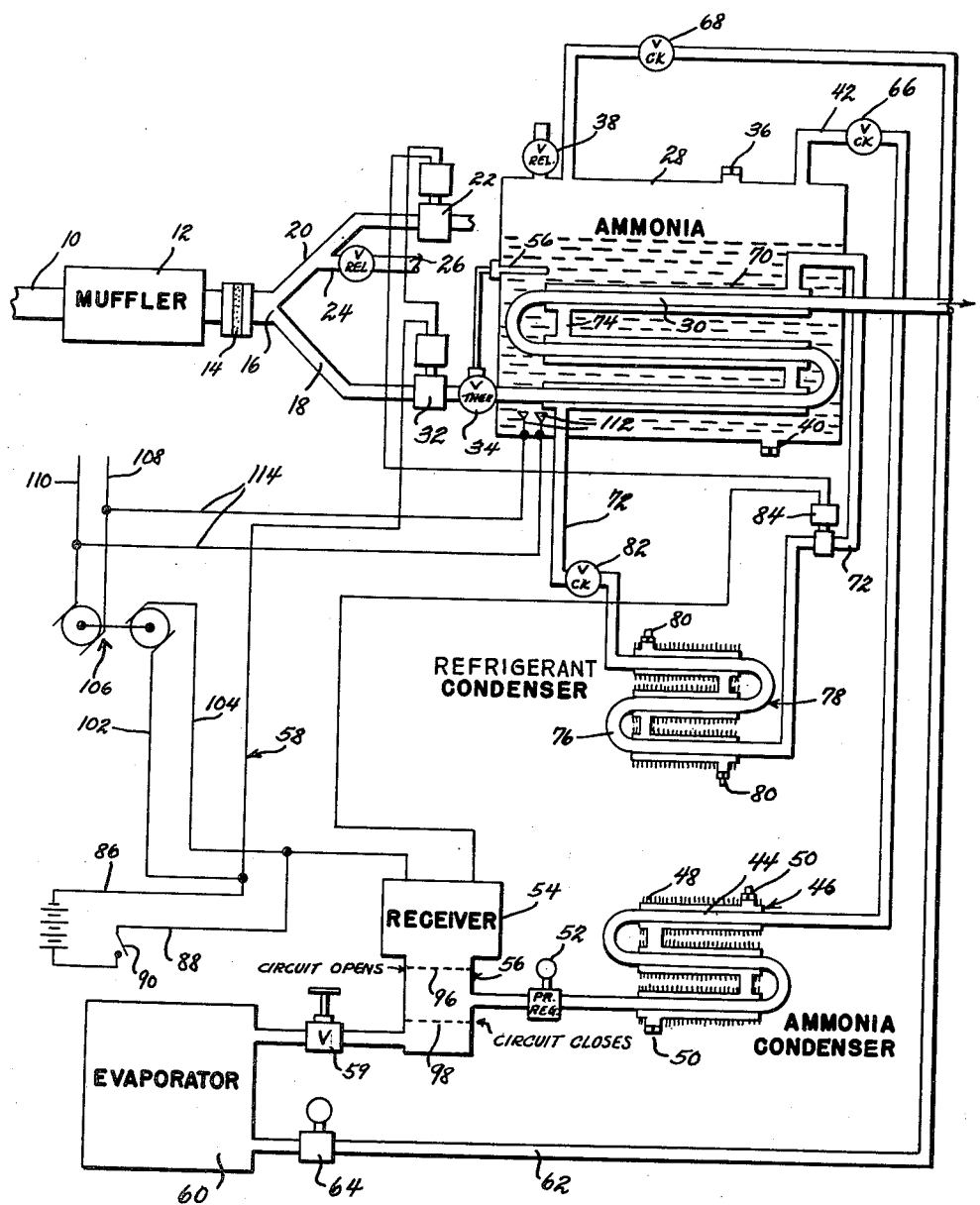
INVENTOR
CHESTER L. KEATING, JR.
BY Wilkinson & Mawhinney
ATTORNEYS Patented Jan. 26, 1954

2,667,040

UNITED STATES PATENT OFFICE 2,667,040

ABSORPTION REFRIGERATION SYSTEM FOR MOBILE APPLICATION

Chester Louis Keating, Jr., New Orleans, La.

Application December 21, 1951, Serial No. 262,698

5 Claims. (Cl. 62—5)

This invention appertains to improvements in refrigerating systems and has for its primary object to provide an absorption refrigeration system, which is specially designed and constructed for mobile application on motor vehicles, boats, railway cars and the like and which utilizes the heat of the products of combustion from the internal combustion engine that operates the mobile carriers as the operating means for the system.

Another object of this invention is to provide a portable absorption refrigeration system which is designed for application in a vehicle, using as the operating means either the heat of the exhaust gases from an internal combustion engine powering the vehicle or the electrical system of the vehicle.

A further object of this invention is to provide valve means for controlling the passage of products of combustion from the engine through a generator, which is part of the refrigerating system and wherein the heat from the products of combustion is utilized to operate the system, and to provide means responsive to the liquid level of the refrigerant in a receiver for automatically governing the operation of the valve means.

A further object of this invention is to provide solenoid valves, which control the operation of the system, and which are actuated by a circuit controlled by liquid level means in the receiver.

A still further object of this invention is to provide means in the generator for transmitting the heat from the products of combustion, which pass through coils in the generator, to the refrigerant absorbent fluid in the generator, the means preferably consisting of a refrigerant gas known commercially under the tradename Freon which is disposed in a closed circuit through the generator and which is controlled by a solenoid valve in the circuit, governed by the liquid level means in the receiver.

A still further object of this invention is to provide an efficient, inexpensive and compact mobile refrigerating apparatus, which is inexpensively operated by utilizing the waste heat from the prime mover for a vehicle.

These and ancillary objects and structural features of merit are attained by this invention, the preferred embodiment of which is set forth in the following description and illustrated in the accompanying drawing, wherein a diagrammatic showing of the absorption type mobile refrigerating apparatus is depicted.

Referring to the accompanying drawing in detail, the numeral 10 designates the exhaust pipe of a vehicle (not shown) which is powered by an internal combustion engine (not shown). A muffler 12 is disposed in the pipe and rearwardly thereof a flexible coupling 14 connects a conduit 16 to the pipe.

Branches 18 and 20 diverge from the conduit 16, the branch 20 providing a passageway for the products of combustion from the engine directly to the atmosphere and the passage of the products of combustion therethrough being controlled by a solenoid valve 22. The solenoid valve 22 is normally open to permit the products of combustion to escape to the atmosphere, without operating the refrigerating system. For safety purposes, when the valve 22 is closed, an auxiliary conduit 24 extends from the branch 20 and is provided with a relief valve 26.

The branch 18 extends into a generator chamber 28 and forms a series of coils 30 within the generator chamber and extends outwardly from the generator chamber rearwardly thereof, so that the products of combustion pass through the branch 18, through the coils 30 and finally escape to the atmosphere, after being conveyed in a delayed fashion through the generator chamber. A solenoid valve 32 is operatively mounted in the branch 18, forwardly of the generator chamber, and is normally closed.

A pressure temperature regulator 34 is disposed in the line 18 just before the generator chamber 28 to prevent excess pressure or temperatures in the generator 28. In conjunction with this, the relief valve 26 in the conduit 24 is provided, the relief valve being weighted and balanced to open at pressures of one half p. s. i. above normal exhaust pressure, so as to obviate any possibility of a back pressure building up in the exhaust line.

The generator chamber is provided with an hermetic valve 36, which is provided for charging and cleaning the chamber. Also, a pressure safety valve 38 is installed in the chamber and a fusible plug 40 is mounted in the bottom of the chamber.

An outlet 42 for the refrigerant, which is preferably ammonia gas, is provided and extends from the generator chamber and is coiled as at 44 through a condensing unit 46. The condensing unit is the double pipe type with water encased on the outside of the tube 42, since the system is of the intermittent type. The condenser 46, which is provided with fins 48 for auxiliary air cooling, is formed with water drain plugs 50. A pressure regulator 52 is mounted in the tube or line 42, downstream from the condenser 46, to assure proper condensation and to insure that only ammonia liquid can accumulate in the receiver 54. The practically dry ammonia gas is, of course, liquified in the ammonia condenser 46 and then passes into the receiver. The receiver, in addition to constituting a reservoir for the ammonia liquid, is provided with a liquid lever control means 56 for controlling an electrical circuit 58 for the valves 22 and 32, as will be subsequently described. An expansion valve 59 is mounted in the line 42, downstream from the receiver, and the liquifying ammonia passes through the expansion valve and into an evaporator 60, where the refrigerating effect is produced. The evaporator 60 is of the conventional coiled type and is located in the body of the vehicle.

A return line or tubing 62 extends from the evaporator to the generator chamber and establishes communication therebetween, with a pressure regulator 64 being mounted in the line, adjacent the evaporator and being installed on the discharge side of the evaporator to assure uniform controlled temperatures. A check valve 66 is mounted in the return line 62, adjacent the generator chamber 28, to prevent the ammonia vapor from backing through the evaporator 60 and a similar check valve 66 is installed in the outlet tubular line 42, adjacent the generator chamber, to prevent the ammonia from backing up into the generator chamber 28.

The coils 30 for the exhaust gases are enclosed by parallel tubes 70, which form part of a closed Freon circuit 72, the tubes being interconnected by transverse sections 74 at their opposite ends. In the gaseous refrigerant circuit or line 72, the tubing is coiled as at 76 and is surrounded by a refrigerant condensing unit 78, which is similar to the condenser 46 and is formed with water plugs 80. A check valve 82 is disposed in the line and a solenoid valve 84 is mounted in the line, the valve operating in conjunction with the solenoid valves 22 and 32.

Power lines 86 and 88 are adapted to be connected to a source of electrical energy, such as the battery for the electrical circuits of the vehicle, with a switch 90 being installed in the line 88 for a purpose to be described. The power lines form a circuit 58, with the solenoids 22, 32 and 84 being wired in series therein.

A liquid two level stage float switch (not shown) is disposed in the receiver 54, one stage being at 96 in the receiver and another stage being at 98. When the liquid drops to the level at 98, the switch, which is wired in the circuit 58, operates to close the circuit 58 and at 96 operates to open the circuit, the switch being controlled by the level of the ammonia liquid in the receiver. Thus, when the liquid reaches the level indicated at 96, the electrical circuit is broken and when the liquid, passing into the evaporator, drops to the level of 98, the electrical circuit is closed. The making and interrupting of the circuit controls the positions of the valves 22, 32 and 84 and thus controls the operation of the refrigerating system, so that the level of the ammonia liquid in the receiver governs the operation of the entire system or refrigerating apparatus.

When the hot products of combustion from the internal combustion engine are used as the operating means, the switch 90 is closed to energize the circuit from the power lines. However, when the engine is not running, the system may be efficiently operated from an outside power source or from a battery or the like by opening the switch 90, which interrupts the circuit 58 from the battery.

The line 86 is connected by a lead 102 and the line 88 is also connected by a lead 104 to a motor generator 106, which is supplied by power lines 108 and 110, which may be plug in 110 A. C. When the circuit 58 is fed from the power lines 108 and 110, electrical heater strips 112 are utilized to generate heat in the generator chamber 28, the strips being connected directly to the power lines 108 and 110 by leads 114.

The operation of the refrigerating system is divided up into two cycles, the generating cycle and the absorption cycle.

*Generating cycle*

On the generating cycle, the products of combustion issuing from the engine through the exhaust pipe 16 are bypassed from their normal passage through the normally open solenoid valve 22 by closing the valve 22 and opening the valve 32, so that the gases pass through the branch 18 and through the coils 30 in the generator chamber. The exhaust gases passing through the generator chamber vaporize the liquid refrigerant in the circuit 72 and the vaporized gas conveys or transfers the heat from the exhaust gases to the refrigerant absorbent fluid. In this respect, the system utilizes silver chloride as the absorbent and ammonia gas as the refrigerant. The ammonia gas is boiled by the heat out of the silver chloride absorbent and the high pressure ammonia gas passes from the generator chamber through the outlet tubing 42. The hot ammonia vapor passes through the condenser 46, where it is liquified, and accumulates in the receiver 54, until it approaches the level 96, whereupon the circuit is opened, causing the valve 32 to return to its normally closed position and the valve 22 to assume its normally open position. The products of combustion are thus conveyed directly to the atmosphere by the branch 20.

The liquified ammonia passes through the expansion valve 59 and into the evaporator 60, where the refrigerating effect is produced.

*Absorption cycle*

With the diverting from the generator chamber of the hot products of combustion issuing from the engine, the silver chloride cools and begins to reabsorb the ammonia in the receiver 54. Since the check valve 66 prevents the ammonia liquid from backing up into the generator chamber, the liquid passes through the expansion valve and the evaporator. The pressure regulator 64 on the discharge side of the evaporator assures uniform controlled temperatures. The ammonia liquid is reabsorbed into the generator chamber through the return line or tubing 62 and when the level of the liquid falls to a point 98 in the receiver, another generation cycle begins, as the electrical circuit is again energized and the solenoid valves again change positions, to divert the hot products of combustion through the generator chamber.

The valve 84 operates in conjunction with the valves 22 and 32 and on the generating cycle, the valve 84 is closed. Thus, the refrigerant is trapped in the generator chamber and the heat from the exhaust gases vaporizes the liquid refrigerant which in turn transfers or conveys the heat to the silver chloride ammonia mixture. When the valve 84 opens on the absorption cycle, a large portion of the liquid refrigerant from the condenser 78 flows through the tubing into the generator and immediately cools the generator chamber for reabsorbing.

It is to be understood, of course, that various other refrigerant or absorbent mixtures can be used and that the system can be mounted on any type of carrier or vehicle, at any desired position and will operate in a most efficient manner.

Having thus described this invention, what is claimed is:

1. For use with a mobile device powered by an internal combustion engine, an absorption refrigeration system comprising a generator containing a liquified refrigerant absorbent mixture, a receiver, an evaporator, an outlet tubing connecting the generator to the receiver and the receiver to the evaporator, a return tubing connecting the evaporator to the generator, means conveying products of combustion from the engine through the generator, means connected to said last means for conveying the products of combustion directly to the atmosphere bypassing the generator, solenoid valves controlling both of said last means a source of electrical energy, and switch means in circuit with the source of electrical energy and the valves for simultaneously actuating the valves in reverse operation, said last means being mounted in the receiver and being responsive to the level of the refrigerant therein.

2. For use with a mobile device powered by an internal combustion engine, an absorption refrigeration system comprising a generator containing a liquified refrigerant absorbent mixture, a receiver, an evaporator, an outlet tubing connecting the generator to the receiver and the receiver to the evaporator, a return tubing connecting the evaporator to the generator, a first conduit connected to the exhaust pipe of the engine and extending through the generator, the portion of the conduit in the generator being coiled, a second conduit connected to the exhaust pipe commonly with the first conduit and leading directly to the atmosphere, valves controlling the passage of products of combustion alternately through the conduits, and means in the receiver responsive to the level of the refrigerant therein for operating the valves, a closed fluid circuit for Freon extending through the generator and including interconnected pipes concentrically disposed on the coiled portion of the first conduit, a condenser in said circuit and a valve in said circuit in advance of the condenser.

3. For use with a mobile device powered by an internal combustion engine, an absorption refrigeration system comprising a generator containing a liquified refrigerant absorbent mixture, a receiver, an evaporator, an outlet tubing connecting the generator to the receiver and the receiver to the evaporator, a return tubing connecting the evaporator to the generator, a first conduit connected to the exhaust pipe of the engine and extending through the generator, the portion of the conduit in the generator being coiled, a second conduit connected to the exhaust pipe commonly with the first conduit and leading directly to the atmosphere, solenoid valves controlling the passage of products of combustion alternately through the conduits, and spaced switch means in the receiver responsive to a high and a low level of the refrigerant therein for operating the valves, a closed fluid circuit for Freon extending through the generator and including interconnected pipes concentrically disposed on the coiled portion of the first conduit, a condenser in said circuit and a solenoid valve in said circuit in advance of the condenser, said last valve being actuated by the means in the receiver simultaneous with the actuation of the valves in the first and second conduits.

4. In combination with a mobile device powered by an internal combustion engine, an absorption refrigeration system comprising a generator containing a liquified refrigerant absorbent mixture, a receiver, an evaporator, an outlet tubing connecting the generator to the receiver and the receiver to the evaporator, a return tubing connecting the evaporator to the generator, a first conduit connected to the exhaust pipe of the engine and extending through the generator, the portion of the conduit in the generator being coiled, a second conduit connected to the exhaust pipe commonly with the first conduit and leading directly to the atmosphere, solenoid valves controlling the passage of products of combustion alternately through the conduit, an electrical circuit connecting the valves to a source of electrical energy, the valve in the second conduit being normally open and the valve in the first conduit being normally closed, and switch means for said circuit disposed in the receiver at vertically spaced points to respond to a predetermined high and low level of the refrigerant in the receiver for establishing and breaking the circuit.

5. For use with a mobile vehicle, an absorption refrigeration system comprising a generator containing a liquified refrigerant absorbent mixture, a receiver, an evaporator, an outlet conduit connecting the generator to the receiver and the receiver to the evaporator, a return conduit connecting the evaporator to the generator, heating means for said generator, a closed fluid circuit for Freon extending through the generator, a valve controlling said fluid circuit and means in said receiver responsive to the level of the refrigerant controlling said valve.

CHESTER LOUIS KEATING, Jr.

References Cited in the file of this patent

UNITED STATES PATENTS

| Number | Name | Date |
| --- | --- | --- |
| 1,904,024 | Wright | Apr. 18, 1933 |
| 1,923,451 | Miller | Aug. 22, 1933 |
| 2,068,333 | Krummell | Jan. 19, 1937 |
| 2,192,367 | Prince | Mar. 5, 1940 |
| 2,287,172 | Harrison et al. | June 23, 1942 |
| 2,293,556 | Newton | Aug. 18, 1942 |